March 7, 1967
F. J. RENNER ETAL
3,307,895
FOOD TRAY CART
Filed Oct. 20, 1965
4 Sheets-Sheet 1
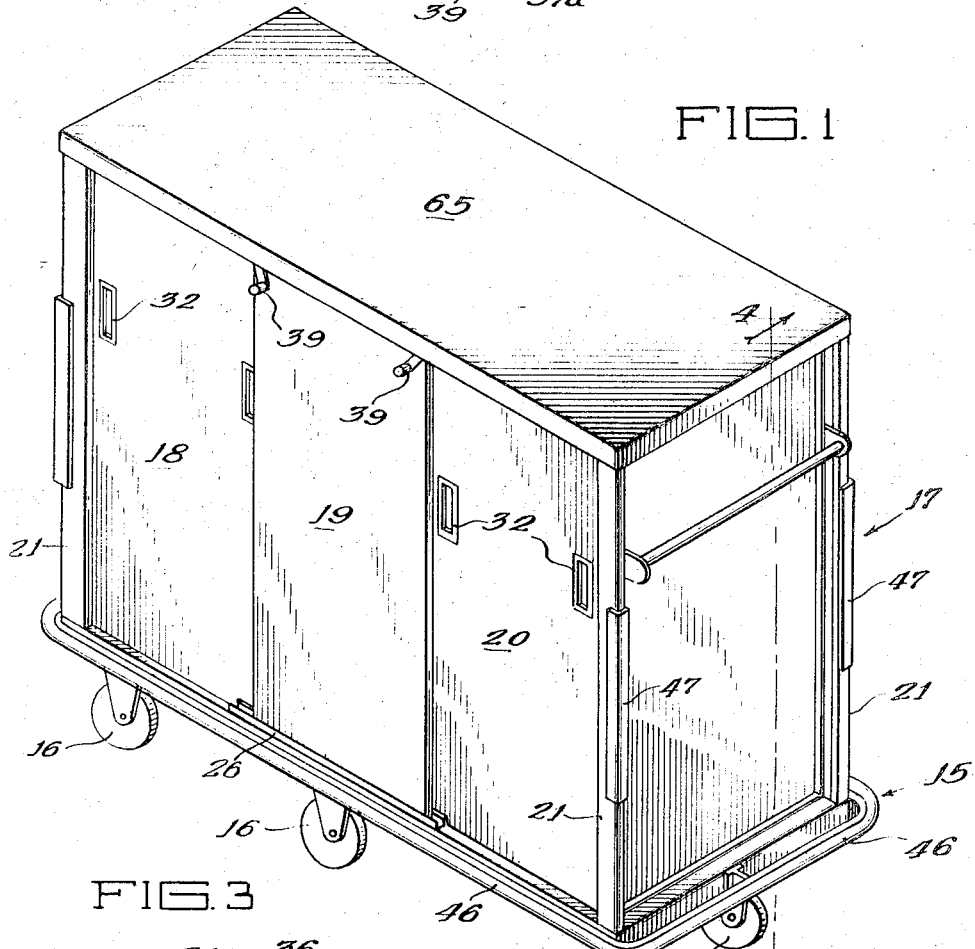

March 7, 1967 F. J. RENNER ET AL 3,307,895
FOOD TRAY CART
Filed Oct. 20, 1965 4 Sheets-Sheet 2
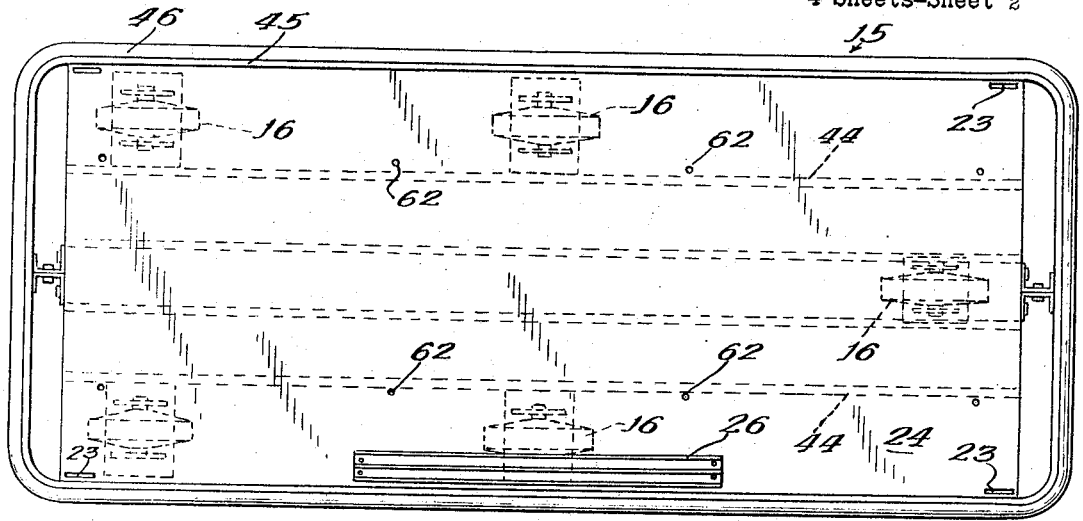
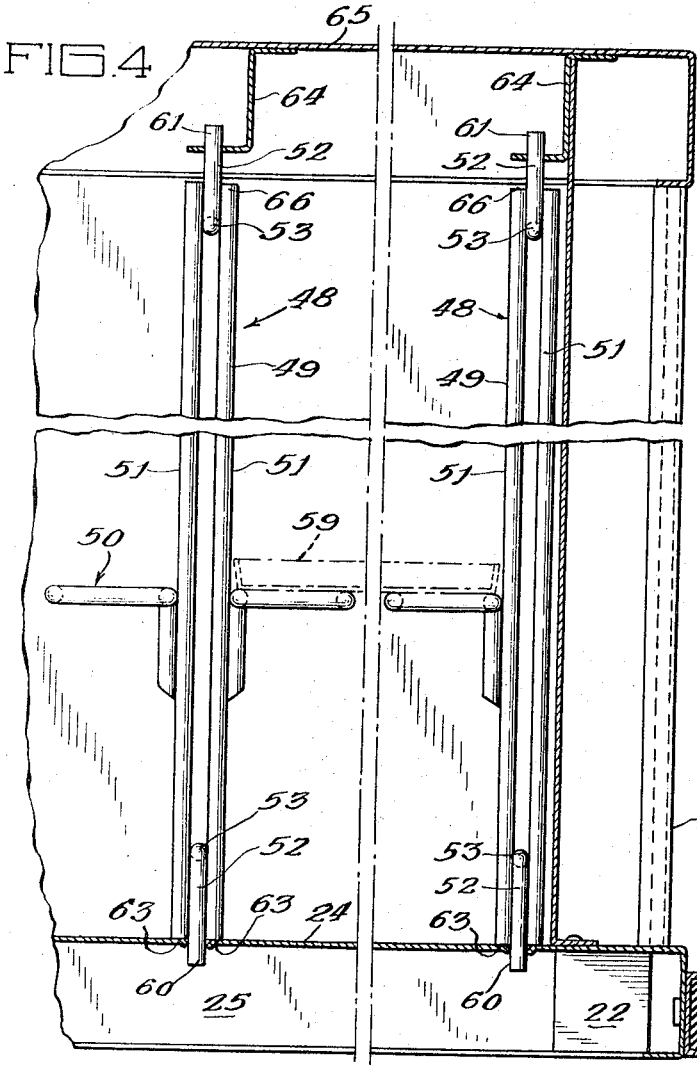
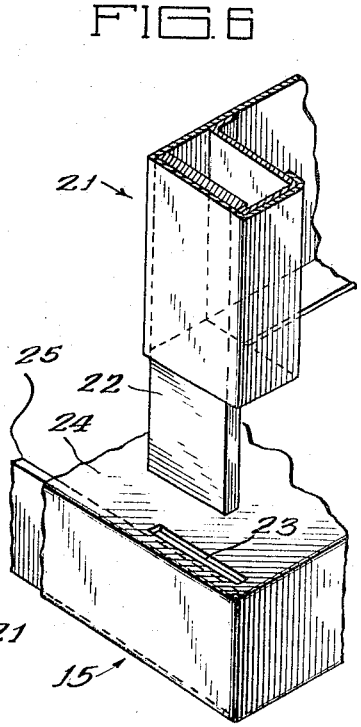

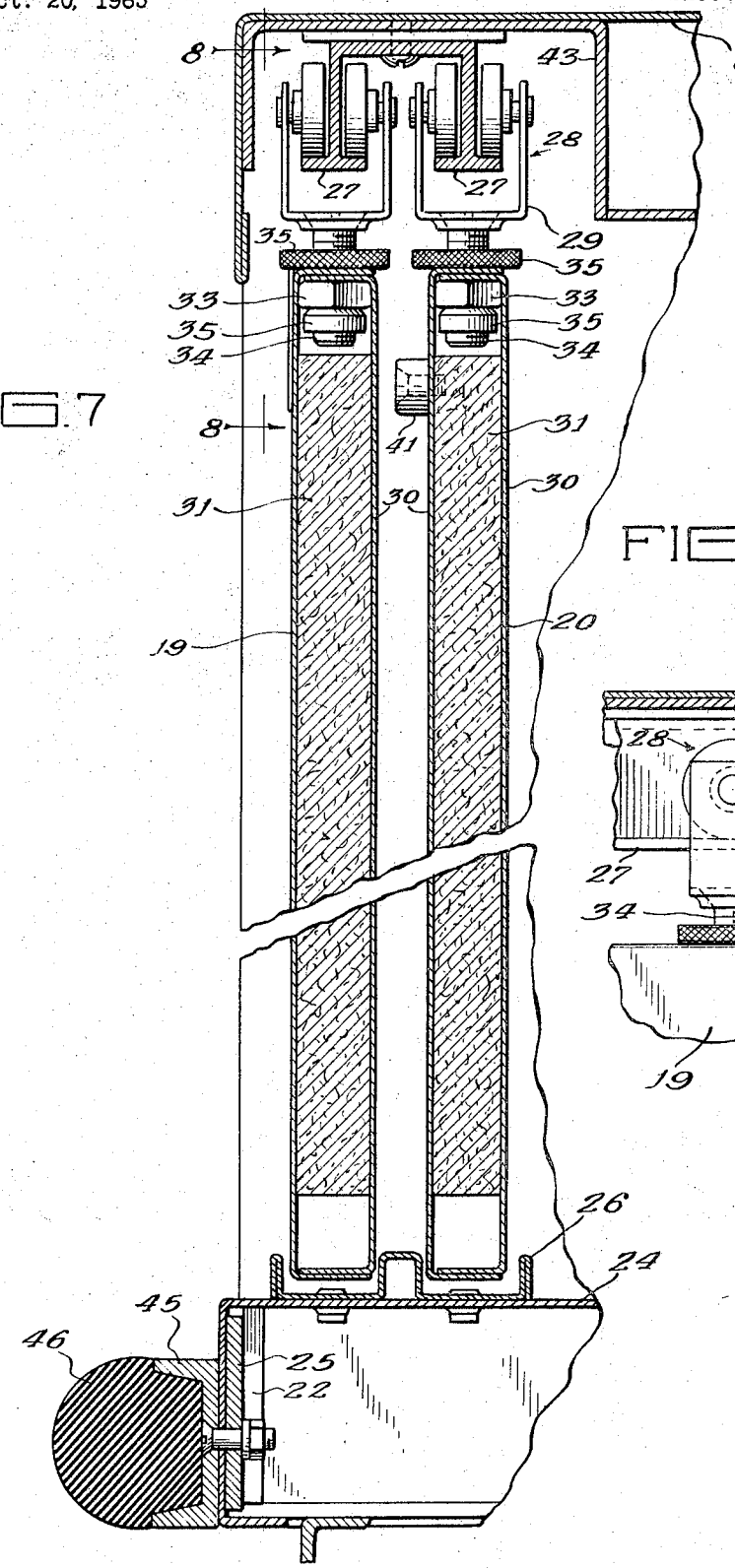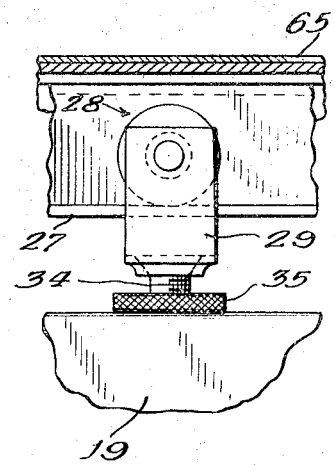

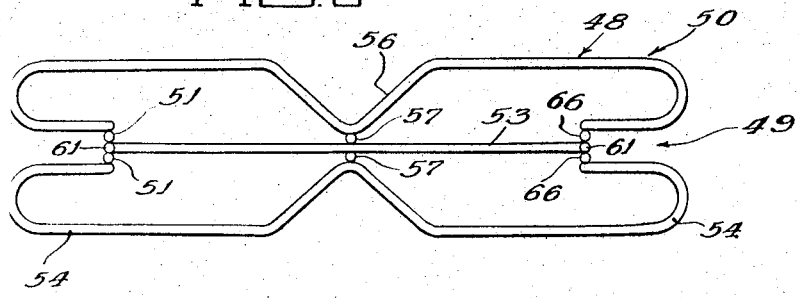
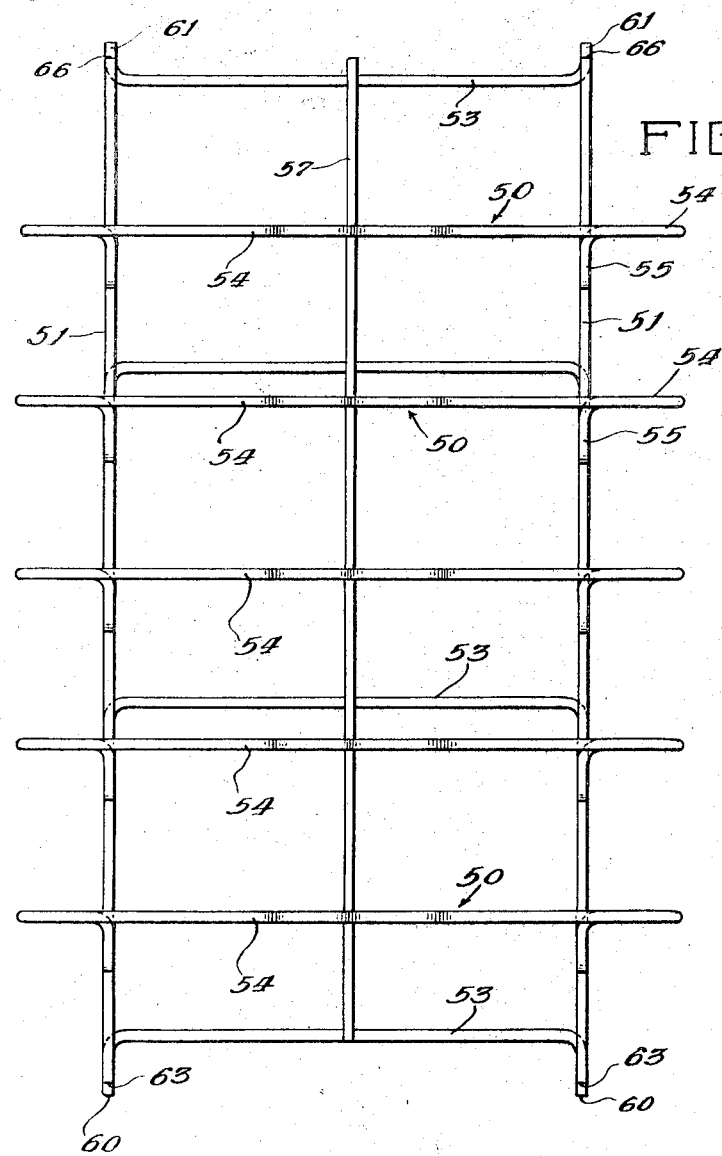
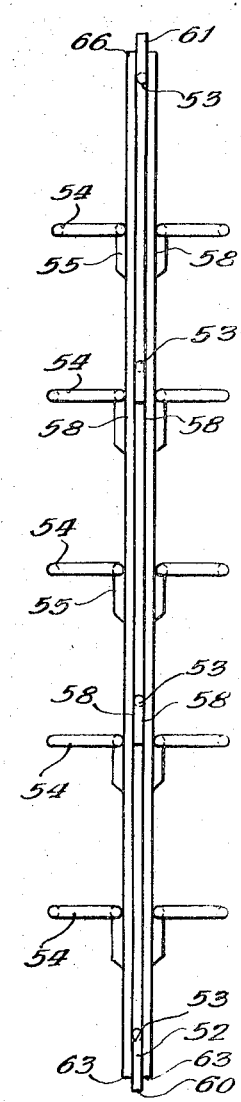

United States Patent Office 3,307,895
Patented Mar. 7, 1967

3,307,895
FOOD TRAY CART
Frank J. Renner, 1710 Surrey Ridge Drive, Arlington Heights, Ill. 60538; William M. Renner, 1202 Orchard Drive, and George B. Renner, 211 Olive St., both of Prospect Heights, Ill. 60070
Filed Oct. 20, 1965, Ser. No. 498,811
8 Claims. (Cl. 312—295)

This invention relates to a food tray cart for use in hospitals and like institutions for delivering meals from one room to another. Such a food tray cart includes an enclosure for protecting the trays and contents from dust and air-borne bacteria, and also to maintain the food at proper serving temperature.

In devices of this type, it is desirable to construct the cart of stainless steel so that it can be sterilized from time to time by steam or hot water.

An object of my invention is to provide an improved tray supporting rack which is removable from the food cart at the time of sterilization so that the racks can be individually scrubbed prior to sterilization and also to facilitate the scrubbing of the interior of the food tray cart prior to sterilization.

A further object is to provide a tray supporting rack in which the uprights are located inwardly of the ends of the tray supporting rails to facilitate access to and removal of the trays.

A further object is to provide an improved tray supporting rack which is sufficiently rigid as to support six or more trays, one above the other.

A further object of this invention is to provide an improved sliding door arrangement to facilitate access to and removal of the trays from the enclosure, and in particular to provide an arrangement in which three doors may be supported from only two tracks.

A further object is to provide a rigid door opening which does not require the use of the tray racks as intermediate supports.

A further object is to provide an improved door construction having stainless steel fastenings and a filler to rigidify the fastenings against noise producing vibration, the door assembly as a whole being sealed so as to permit steam sterilization.

Other objects, features and advantages will become apparent as the description proceeds.

With reference now to the drawings in which like reference numerals designate like parts:

FIG. 1 is a perspective view of a tray cart embodying our invention;

FIGS. 2 and 3 are plan and side elevation details showing the operation of the door lock;

FIG. 4 is a fragmentary vertical view taken along the line 4—4 of FIG. 1;

FIG. 5 is a plan view of the base;

FIG. 6 is an exploded view in perspective showing the manner of assembly of the front corner post and the base;

FIG. 7 is a vertical transverse section showing the sliding door arrangement;

FIG. 8 is a vertical section taken along line 8—8 of FIG. 7; and

FIGS. 9, 10 and 11 are plan, side and end views, respectively, of the tray supporting rack.

With reference now to FIGS. 1, 4 and 7, the food tray cart comprises a base 15 supported by five wheels 16, and an enclosure 17 mounted on the base. One side wall of the enclosure is in the form of three sliding doors 18, 19 and 20, to afford access to the interior of the enclosure.

The structure of the enclosure 17 includes four corner posts 21 of box-like cross section as shown in FIG. 6. A tongue 22, in the form of a short steel strip, projects from the lower end of each corner post and is received in slots 23 formed in the base 15. The side and rear panels 17a provide rigid corner connections at the rear corners.

The base 15 comprises a sheet metal member 24 which is reinforced by two box beams 44 secured to the undersurface of the member 24. At the front edge a vertically disposed edge strip 25 provides additional reinforcement. The tongues 22 of the front corner posts 21 are welded to the edge strip 25 to provide a rigid lower corner connection to compensate for the lack of the panel reinforcing means which is provided by the side and rear panels at the rear corners. The arrangement also provides a firm support for the top beam 43 which connects the upper ends of the front corner posts.

The top beam 43 is channel-shaped and carries on its under side, two door tracks 27. The middle door 19 is supported from the outer track 27 by means of two trolleys 28, and the end doors 18 and 20 are supported from the inner track 27 by similar trolleys 28, as shown in FIGS. 7 and 8. The lower edges of the doors are clear of the base member 24, but as shown in FIGS. 4 and 7, a double guide groove member 26 is provided which maintains the spacing between the doors when in overlapping relationship, and also prevents swinging. According to the present arrangement, it is not necessary that the double guide groove member 26 extend for the full length of the base, as long as it overlaps at least part of the end doors, as shown in FIG. 1.

Each of the trolleys 28 includes a yoke 29 from which the door may be supported by a screw 34.

As shown in FIG. 7, each door comprises two pan elements 30 made of stainless steel which are telescoped one into the other, the inner space being occupied by a filler of plywood or like wood product to give the door body. The side surfaces of the filler 31 are adhesively secured to the inner surfaces of the pans 30 to provide a sound deadening effect, and the assembly as a whole provides substantial terminal insulation for the contents of the cart. Hand grips 32 are set into the surface of the doors, and at underlying points, the plywood panel 31 is cut away to accommodate same. The flanges of the pan elements 30 are welded to each other or otherwise sealed to prevent entry of moisture during sterilization.

At the upper edge of each door, a nut 33 is welded in place to receive the screw 34. Lock nuts 35 are provided to maintain the position of the parts. This arrangement permits the adjustment of the door elevation during assembly so that the lower door edge will be maintained clear of the base member 24, but will still extend into grooves provided by the guide member 26.

Door locks 36 are provided to maintain the doors in their extended or closed position as shown in FIG. 1, and according to the arrangement shown it is possible to lock all three doors by means of only two door locks 36. This is accomplished by preventing relative sliding movement of one door with respect to the other, instead of locking each door with respect to the structure of the enclosure. The door locking means is so located that it does not interfere with the trolleys 28 and tracks 27, and is also of a simple construction so that it will provide a minimum of crevices in which dirt can lodge.

The structural details of the door lock are shown in FIGS. 2 and 3 for the sake of completeness, but do not form a part of our invention. Each door lock 36 comprises a U-shaped member which straddles the top edge of the middle door 19 at one or the other of its corners.

The U-shaped member is heavily mounted on the door by means of a bolt 38 which extends through the outer and inner legs 37a, 37b of the member 37. The member 37 also includes a connecting member 37c which engages the top edge of the door and serves as a stop. An operating knob 39 is mounted on the outer leg 37a.

A locking lug 40 projects substantially at right angles to the inner leg 37b, and the outer edge 42 engages a rubber bumper 41 mounted on the end door 20. The stop provided by the connecting portion 37a maintains the parts 41 and 42 in registry with each other, in the sense that is prevents overthrow. However, when the U-shaped member 37 is rotated into or through its vertical position, the locking lug 40 will be clear of the bumper 41, and permit relative sliding movement of the doors 19 and 20. As shown in FIG. 3 the arrangement is such that the bumper 41 is located below the pivot bolt 38 so that any attempt to slide either door will merely wedge the parts more tightly into the operated position, as limited by the engagement of the connected portion 37c with the door edge. Preferably, then the edge 42 is cut at a slight angle to the perpendicular in order to insure against any camming out action.

Thus, it will be seen that when both door locks 36 are in their operated positions, no one door may be opened, that is, slid away from the extended position shown into an overlapping position. When the door lock 36 is thrown in the other direction, the parts may move without interference due to the spacing which is maintained by the two tracks 37 and the guide groove member.

The base 15 is completely surrounded by a reinforcing channel 45 which supports a rubber bumper strip 46, as shown in FIGS. 1, 4, 5 and 7. Thus the structure of the enclosure is protected against bumping into the wall, and when passing through doors. Rubber bumper strips 47 may also be provided for the corner posts 21, as shown in FIG. 1.

As shown in FIG. 4 a number of tray supporting racks 48 are mounted within the enclosure 17. Preferably the racks are arranged to support three stacks of trays, and access to any one stack is provided by opening just one of the doors. However, it will be understood that a greater or lesser number of racks can be provided if desired.

As shown in FIGS. 9, 10 and 11, each rack 48 comprises a pair of uprights 49 and a plurality of horizontally disposed tray supporting slides or rails 50. The two center racks have rails on both sides, as shown in FIG. 4, whereas the end racks have rails only on one side. All parts of the rack are made of ¼-inch rod stock which permits smooth sliding movement of the tray over the surface of the rails 50. Preferably, the rod stock is either cold rolled steel with chrome plating over nickel or 302 stainless steel, electropolished. In either event a hard smooth surface is provided which is noncorrosive, and which is capable of being scrubbed and sterilized.

Each upright 49 is a composite member formed of two vertical rods 51 which are spaced from each other by the downturned ends 52 of cross bars 53. There may be four of such cross bars as shown, although the ends of the top cross bars 53 are turned upwardly. The rods 51 are welded to the downwardly or upwardly turned ends 52.

The rails 50 are in the form of a length of rod the ends of which are bent back upon themselves to provide loop portions 54 which extend outwardly beyond the uprights 59. Thus, a 20-inch tray, for example, can be supported along its full length even though the uprights are only 14-inches apart. This arrangement permits one to grasp the tray initially by its corner, providing easier access than if the rails were located at the corner of the tray. Furthermore, it permits a considerable amount of aligning after the end of the tray has been placed on the loop portion and preparatory to sliding the tray longitudinally into the enclosure. In other words, the alignment can be accomplished after a portion of the tray weight has been taken up by the loop portions.

The ends of each horizontal rod length are turned downwardly so that they are parallel to and overlie one of the rods 51 of each pair, and these downwardly turned ends 55 are then welded to their respective vertical rods 51. This provides a connection which is not subject to flexure due to the weight of the tray; in other words, the welded connection is subject to shear but not to flexure.

The arrangement described provides an extremely rigid structure, for the reason that the use of two spaced rods 51 in each upright provide great stiffness against flexure in one direction, being the left to right direction as viewed in FIG. 11, whereas the cross bars 53 provide a column reinforcement in the other direction. The downturned ends of the cross bars, being welded along the length, prevent warping and weaving of the overall rectangular rack structure. Such reinforcement is desirable due to the use of the loop portions 54 which detracts from their value as transverse reinforcing members.

In order to further reinforce the structure, and in particular to reduce vibration induced noise, the mid portion 56 of each rail 50 is turned inwardly as shown in FIG. 9 and welded to spaced center rods 57 which in turn are welded to the cross bars 53. It is not necessary that the center rods 57 be extended downwardly into contact with the base 15 to serve as support. Certain of the weld points are designated by the reference numeral 58 for purpose of illustration. The manner in which the tray 59 is supported is shown in FIG. 4.

The downturned end 52 of the bottom cross bar 53 projects beyond the lower ends 63 of the rods 51 to provide a bottom pilot 60, and the upturned end 52 of the topmost cross bar 53 projects beyond the upper ends 66 of the rods 51 to provide a top pilot 61. The bottom pilot 60 is received in openings 62 formed in the base sheet member 24 adjacent to the box beams 55. Thus, the weight of the racks 48, the trays 59 and the tray contents is taken up by the engagement of the lower ends 63 of the rods 51 with the base sheet member 24.

Z-strips 64 secured to the top panel 65 of the enclosure 17 have perforated lower ends for receiving the top pilot 61. Here the top ends 66 are spaced beneath the flange of the Z-strip by a sufficient distance so as to permit the rack to be lifted upwardly until the bottom pilot 60 clears the base sheet member 24, thus permitting removal of each rack. Thus, I am enabled to provide a very strong tray supporting structure which does not require a fixed connection to the structure of the enclosure, but rather a tray supporting structure which can be easily disassembled and assembled for purposes of cleaning and sterilization. The holes 62 in the base sheet member 24, after the racks 48 are removed, serve as drain holes during steam sterilization, although other drain holes may be provided in the base sheet if desired.

To summarize the operation which has been detailed in connection with the detailed description of the several parts and subassemblies, it will now be apparent that the loading is accomplished one stack at a time, first the end door 20 being opened, and the trays loaded from the bottom up. The inward spacing of the uprights 59 in combination with the loop portions 54, facilitates the insertion of each tray. After the first stack has been loaded, the end door 20 is closed, and the middle door 19 slid into overlapping relationship with either one of the end doors, and the process is repeated in a similar manner for the stack behind the end door 18. Then the door locks 36 are thrown into their operated position after all of the doors are closed with the result that the food is protected from dust and air-borne bacteria during delivery.

By virtue of the rigid corner connection, it is possible to provide a door opening which does not require the use of racks as intermediate supports for the top beam, thus permitting the use of the easily removable tray supporting racks described herein.

Although only a preferred embodiment of our invention is shown and described herein, it will be understood that various changes and modifications can be made in the construction shown without departing from the scope of our invention as pointed out in the appended claims.

We claim:

1. A food tray cart comprising a base member, an enclosure mounted on said base member, tray supporting racks disposed within said enclosure, and slidably mounted door means forming one side wall of said enclosure to provide access to said tray supporting racks, said enclosure including a top wall, said tray supporting rack comprising a pair of uprights, a plurality of horizontally disposed tray supporting rails supported by said uprights in vertically spaced relationship each upright including a pair of vertically extending parallel rods, a plurality of cross bars connecting each pair of rods, said cross bars each having bent ends which are parallel to said rods and disposed between the two rods of a pair to provide spacing means for spacing said two rods of each pair from each other, said bent ends being welded to both rods of a pair to provide a substantially rigid assembly of uprights and cross bars, the bent ends of said bottom cross bar extending downwardly below the lower ends of said vertical rods to provide a bottom pilot, and the bent ends of said top cross bar extending upwardly beyond the upper ends of said vertical rods to provide a top pilot, said bottom pilot extending into openings formed in said base member, and apertured means mounted on the underside of said top wall, said top pilot extending into said apertured means, the distance between said base member and said apertured means being greater than the length of said vertical rods to permit removal of said rack from said enclosure.

2. A tray supporting rack for a food cart comprising a pair of uprights, a plurality of horizontally disposed tray supporting rails supported by said uprights in vertically spaced relationship, each upright including a pair of vertically extending parallel rods, a plurality of cross bars connecting each pair of rods, said cross bars each having bent ends which are parallel to said rods and disposed between the two rods of a pair to provide spacing means for spacing said two rods of each pair from each other, said bent ends being welded to both rods of a pair to provide a substantially rigid assembly of uprights and cross bars, said tray supporting rails each comprising a rod member having a loop portion at each end which extends beyond each of said uprights, the two ends of said rod being disposed inwardly of said loops and being bent parallel to said upright and being welded thereto, the bent ends of said bottom cross bar being bent downwardly and extending below the ends of said vertical rods to provide a bottom pilot, and the ends of said top cross bar being bent upwardly and extending beyond the ends of said vertical rods to provide a top pilot.

3. A tray supporting rack as claimed in claim 2 which includes a pair of vertical rods disposed midway between said uprights and welded to said cross bars, said tray supporting rails each having a mid portion which is bent toward said intermediate vertical rods and welded thereto to provide additional support for said rails.

4. A food tray cart comprising a slotted base member, an enclosure mounted on said base member, removable tray supporting racks disposed within said enclosure, and slidably mounted door means forming one side wall of said enclosure to provide access to said tray supporting racks, said enclosure including two front corner posts, said base member including a vertical edge strip at the front edge thereof, and each front corner post having a tongue projecting into said slotted base member and overlying said edge strip and being welded thereto, a top beam connecting said corner posts above said sliding door means, a pair of tracks secured to the underside of said top beam, and trolley means supporting said sliding door means from said tracks.

5. A food tray cart as claimed in claim 4 in which said top beam is a downwardly facing channel member.

6. A food tray cart comprising a base member, an enclosure mounted on said base member, removable tray supporting racks disposed within said enclosure, and slidably mounted door means forming one side wall of said enclosure to provide access to said tray supporting racks, a pair of tracks located above said sliding door means, said sliding door means including a middle door and two end doors, said doors each comprising a pair of pan-shaped sheet metal elements telescoped one into the other, and a panel of fibrous material enclosed within said pan-shaped elements, a first trolley means supporting said middle door from one of said tracks, and second and third trolley means supporting said end doors from the other of said tracks to permit sliding movement of any one of said three doors into a position where it overlaps another one of said doors, and means preventing sliding movement of any one of said doors in the direction of said overlapping position in order to lock all of said doors in their extended positions.

7. A food tray cart as claimed in claim 6 in which the side surfaces of said panel of fibrous material are adhesively secured to the inner surfaces of said pan-shaped elements.

8. A food tray cart as claimed in claim 6 which includes a double guide groove member mounted on said base member beneath said middle door and beneath only a portion of said end doors when in closed position, and loosely engaging the lower ends of said doors.

References Cited by the Examiner

UNITED STATES PATENTS

| 2,636,797 | 4/1953 | Alheit | 312—321 X |
| 3,042,384 | 7/1962 | Bauman | 312—236 X |
| 3,240,544 | 3/1966 | Heckel et al. | 312—214 |

FOREIGN PATENTS

| 769,844 | 6/1934 | France. |

CLAUDE A. LE ROY, *Primary Examiner.*

F. DOMOTOR, *Assistant Examiner.*